US012602553B2

(12) United States Patent
Li et al.

(10) Patent No.: US 12,602,553 B2
(45) Date of Patent: Apr. 14, 2026

(54) SPEECH TRANSLATION METHOD, DEVICE, AND STORAGE MEDIUM

(71) Applicant: BEIJING BYTEDANCE NETWORK TECHNOLOGY CO., LTD., Beijing (CN)

(72) Inventors: Lei Li, Beijing (CN); Mingxuan Wang, Beijing (CN); Qianqian Dong, Beijing (CN); Chengqi Zhao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 348 days.

(21) Appl. No.: 18/245,802

(22) PCT Filed: Sep. 2, 2021

(86) PCT No.: PCT/CN2021/116232
§ 371 (c)(1),
(2) Date: Mar. 17, 2023

(87) PCT Pub. No.: WO2022/057637
PCT Pub. Date: Mar. 24, 2022

(65) Prior Publication Data
US 2024/0028841 A1 Jan. 25, 2024

(30) Foreign Application Priority Data

Sep. 18, 2020 (CN) .......................... 202010987456.7

(51) Int. Cl.
*G06F 40/47* (2020.01)
*G06F 18/2415* (2023.01)
(Continued)

(52) U.S. Cl.
CPC .............. *G06F 40/47* (2020.01); *G10L 15/02* (2013.01); *G10L 15/063* (2013.01); *G10L 15/16* (2013.01); *G10L 15/1815* (2013.01)

(58) Field of Classification Search
CPC .......... G06F 40/47; G06F 40/30; G06F 40/58; G06F 18/2415; G10L 15/02;
(Continued)

(56) References Cited

U.S. PATENT DOCUMENTS 4,803,729 A * 2/1989 Baker ..................... G10L 15/04
704/E15.005
10,249,294 B2 4/2019 Kim et al.
(Continued)

FOREIGN PATENT DOCUMENTS

CN 108231062 A 6/2018
CN 110556100 A 12/2019
(Continued)

OTHER PUBLICATIONS

Bart: Denoising Sequence-to-Sequence Pre-training for Natural Language Generation, Translation, and Comprehension, Lewis et al., arXiv (Year: 2019).*
(Continued)

*Primary Examiner* — Hai Phan
*Assistant Examiner* — Ian Scott Mclean

(57) ABSTRACT

Provided are a speech translation method, a device, and a storage medium. The method includes: extracting, through an encoder of an end-to-end speech translation model, the semantic feature of a to-be-processed speech; decoding, through a decoder of the end-to-end speech translation model, a source language text corresponding to the semantic feature from the semantic feature; decoding, through the decoder of the end-to-end speech translation model, the semantic feature according to the source language text to
(Continued)

obtain a text sequence corresponding to the semantic feature; and splitting the text sequence to obtain a target language text corresponding to the to-be-processed speech.

12 Claims, 3 Drawing Sheets

(51) Int. Cl.

| | |
|---|---|
| *G06F 40/30* | (2020.01) |
| *G06F 40/58* | (2020.01) |
| *G06N 3/045* | (2023.01) |
| *G06N 3/08* | (2023.01) |
| *G10L 15/02* | (2006.01) |
| *G10L 15/06* | (2013.01) |
| *G10L 15/16* | (2006.01) |
| *G10L 15/18* | (2013.01) |
| *G10L 15/26* | (2006.01) |
| *G10L 25/24* | (2013.01) |

(58) Field of Classification Search
CPC ... G10L 15/063; G10L 15/16; G10L 15/1815; G10L 2015/025; G10L 15/26; G10L 25/24; G06N 3/045; G06N 3/08
See application file for complete search history.

(56) References Cited

U.S. PATENT DOCUMENTS

| | | | |
|---|---|---|---|
| 11,694,677 B2 * | 7/2023 | Lee | G06N 3/045 |
| | | | 704/232 |
| 2018/0075844 A1 | 3/2018 | Kim et al. | |
| 2021/0056975 A1 * | 2/2021 | Peng | G10L 17/04 |
| 2021/0065690 A1 * | 3/2021 | Indurthi | G10L 15/183 |

FOREIGN PATENT DOCUMENTS

| | | |
|---|---|---|
| CN | 111326157 A | 6/2020 |
| CN | 111368559 A | 7/2020 |
| CN | 112183120 A | 1/2021 |

OTHER PUBLICATIONS

Mass: Masked Sequence to Sequence Pre-training for Language Generation, Song et al., arXiv (Year: 2019).*
Search Report issued Oct. 28, 2021 for PCT Application No. PCT/CN2021/116232, English translation, (4 pages).
Written Opinion for International Application No. PCT/CN2021/116232, mailed Oct. 28, 2021, 9 Pages.
First Search Report issued Jul. 11, 2023 in Chinese Application No. 202010987456.7, with English translation (4 pages).
First Office Action issued Jul. 13, 2023 in Chinese Application No. 202010987456.7, with English translation (12 pages).

* cited by examiner

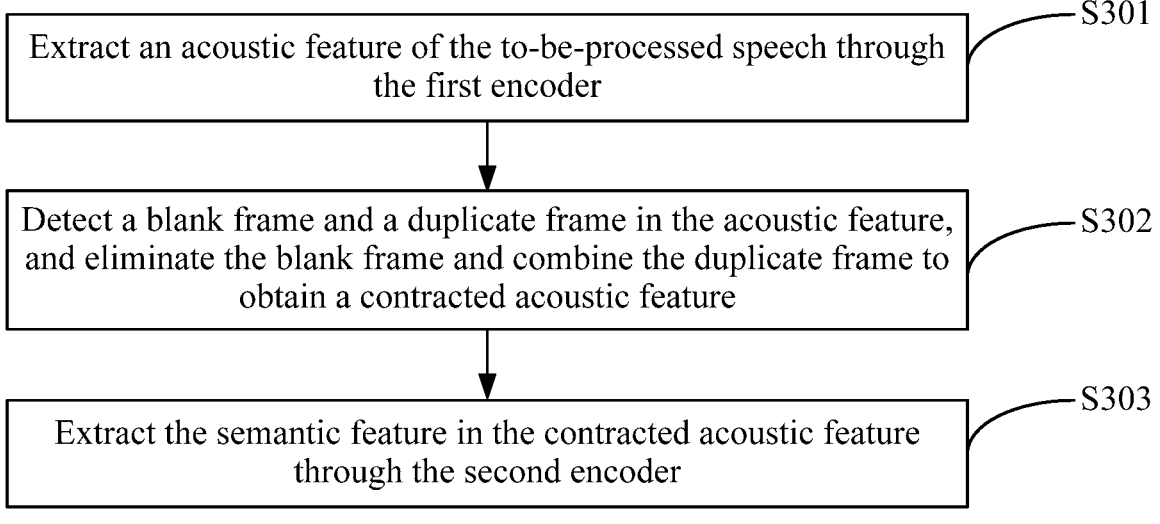

Extract an acoustic feature of the to-be-processed speech through the first encoder ── S301

Detect a blank frame and a duplicate frame in the acoustic feature, and eliminate the blank frame and combine the duplicate frame to obtain a contracted acoustic feature ── S302

Extract the semantic feature in the contracted acoustic feature through the second encoder ── S303

FIG. 3

Pre-train the decoder of the end-to-end speech translation model according to text translation samples to obtain an initial decoder ── S401

Initialize the decoder of the end-to-end speech translation model based on the initial decoder ── S402

Train the initialized end-to-end speech translation model ── S403

FIG. 4

501 — Encoding module

502 — First decoding module

503 — Second decoding module

504 — Splitting module

Speech translation apparatus

600

601 — Processing apparatus

602 — ROM

603 — RAM

604

605 — I/O interface

606 — Input apparatus

607 — Output apparatus

608 — Storage apparatus

609 — Communication apparatus

SPEECH TRANSLATION METHOD, DEVICE, AND STORAGE MEDIUM

CROSS-REFERENCE TO RELATED APPLICATIONS

This is a National Stage Application, filed under 35 U.S.C. 371, of International Patent Application No. PCT/CN2021/116232, filed on Sep. 2, 2021, which claims priority to Chinese Patent Application No. 202010987456.7 filed with the China National Intellectual Property Administration (CNIPA) on Sep. 18, 2020, the disclosures of which are incorporated herein by reference in their entireties.

TECHNICAL FIELD

The present application relates to the field of computer technology, and in particular, a speech translation method, a device, and a storage medium.

BACKGROUND

With the continuous development of neural networks and the explosive growth of data, end-to-end speech translation technology comes into being. End-to-end speech translation establishes a mapping relationship from a source language speech signal to a target language text, thereby implementing translation from an original speech to a target translation text. However, the prediction performance of the current end-to-end speech translation model still does not meet the desired requirements.

SUMMARY

The present application provides a speech translation method and apparatus, a device, and a storage medium to improve prediction performance of speech translation.

A speech translation method is provided and includes extracting, through an encoder of an end-to-end speech translation model, the semantic feature of a to-be-processed speech; decoding, through a decoder of the end-to-end speech translation model, a source language text corresponding to the semantic feature from the semantic feature; decoding, through the decoder of the end-to-end speech translation model, the semantic feature according to the source language text to obtain a text sequence corresponding to the semantic feature, where the text sequence includes the source language text and a target language text corresponding to the source language text; and splitting the text sequence to obtain the target language text corresponding to the to-be-processed speech.

A speech translation apparatus is further provided and includes an encoding module, a first decoding module, a second decoding module, and a splitting module.

The encoding module is configured to extract, through an encoder of an end-to-end speech translation model, the semantic feature of a to-be-processed speech.

The first decoding module is configured to decode, through a decoder of the end-to-end speech translation model, a source language text corresponding to the semantic feature from the semantic feature.

The second decoding module is configured to decode, through the decoder of the end-to-end speech translation model, the semantic feature according to the source language text to obtain a text sequence corresponding to the semantic feature. The text sequence includes the source language text and a target language text corresponding to the source language text.

The splitting module is configured to split the text sequence to obtain the target language text corresponding to the to-be-processed speech.

An electronic device is further provided and includes a memory storing computer programs and a processor. When the computer programs are executed by the processor, the preceding speech translation method provided in the present application is implemented.

A computer-readable storage medium is further provided and stores computer programs. When the computer programs are executed by a processor, the preceding speech translation method provided in the present application is implemented.

BRIEF DESCRIPTION OF DRAWINGS

FIG. 3 is a flowchart of another speech translation method according to an embodiment of the present application.

FIG. 4 is a flowchart of a training process of an end-to-end speech translation model according to an embodiment of the present application.

DETAILED DESCRIPTION

Figure 1:
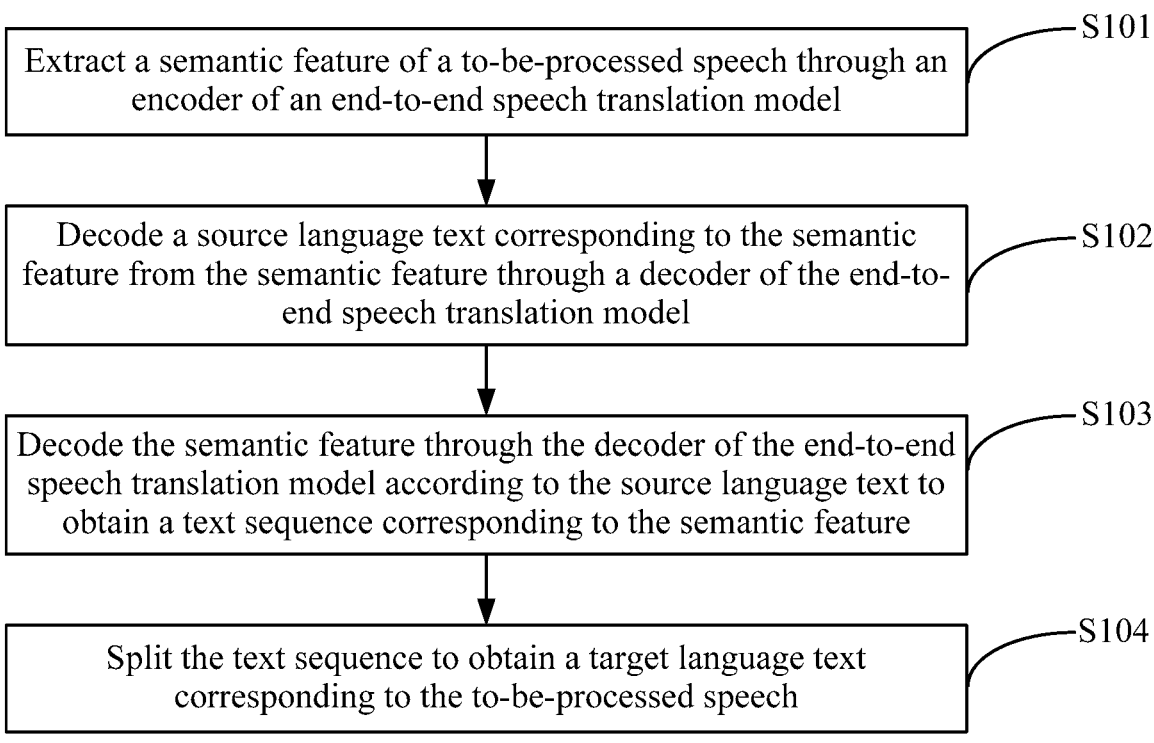
FIG. 1 is a flowchart of a speech translation method according to an embodiment of the present application.

Embodiments of the present disclosure are described below with reference to the drawings. The drawings illustrate some embodiments of the present disclosure, but it is to be understood that the present disclosure may be implemented in various manners and should not be limited to the embodiments set forth herein. Conversely, these embodiments are provided for an understanding of the present disclosure. The drawings and embodiments of the present disclosure are merely for illustrative purposes and are not intended to limit the scope of the present disclosure.

The various steps recited in method embodiments of the present disclosure may be performed in a different order and/or in parallel. In addition, the method embodiments may include additional steps and/or omit execution of illustrated steps. The scope of the present disclosure is not limited in this respect.

As used herein, the term "comprise" and variations thereof are intended to be inclusive, that is, "including, but not limited to". The term "based on" is "at least partially based on". The term "an embodiment" refers to "at least one embodiment". The term "another embodiment" refers to "at least one another embodiment". The term "some embodiments" refers to "at least some embodiments". Related definitions of other terms are given in the description hereinafter.

Concepts such as "first" and "second" in the present disclosure are merely intended to distinguish one from another apparatus, module, or unit and are not intended to limit the order or interrelationship of the functions performed by the apparatus, module, or unit.

"One" and "a plurality" mentioned in the present disclosure are illustrative, are not intended to limit the present disclosure, and should be understood as "one or more" unless expressed in the context.

The names of messages or information exchanged between multiple apparatuses in embodiments of the present disclosure are only for illustrative purposes and are not intended to limit the scope of such messages or information.

Speech-to-text translation usually uses a pipeline system of automatic speech recognition and machine translation. However, the pipeline system has disadvantages such as long delay, parameter redundancy, error accumulation, and speech feature loss.

In recent years, the end-to-end speech translation technology has attracted extensive attention. The end-to-end speech translation is able to directly translate a speech in the form of a source language into a text in the form of a target language, thereby effectively avoiding the technical issues existing in the pipeline system. However, the end-to-end speech translation still faces many issues. The prediction performance of the end-to-end speech translation still does not meet the desired requirements. Therefore, the technical schemes provided in embodiments of the present application can improve the prediction performance of the end-to-end speech translation model.

Embodiments of the present application are described below with reference to the drawings. If not in collision, the embodiments described herein and the features thereof can be combined with each other.

The execution subject may be a speech translation apparatus in the method embodiment described below, and the apparatus may be implemented as part or all of the electronic device by relying on software, hardware, or a combination of software and hardware. The electronic device may be a client, including, but not limited to, a smartphone, a tablet computer, an e-book reader, a vehicle-mounted terminal, and the like. The electronic device may also be an independent server or a server cluster. The specific form of the electronic device is not limited in the embodiments of the present application. The method embodiment below is illustrated by using an example in which the execution subject is the electronic device.

FIG. 1 is a flowchart of a speech translation method according to an embodiment of the present application. This embodiment relates to a specific process of how an electronic device translates a speech in the form of a source language into a text in the form of a target language based on an end-to-end speech translation model. As shown in FIG. 1, the method may include the following steps.

In S101, a semantic feature of a to-be-processed speech is extracted through an encoder of an end-to-end speech translation model.

The to-be-processed speech is a speech that requires speech-to-text translation. The to-be-processed speech may be any source language, and the translated text is another target language corresponding to the source language. If the source language is English, the target language corresponding to the source language may be French. In an embodiment, before S101, the electronic device needs to acquire the to-be-processed speech of the source language. As an example, the electronic device may select a to-be-processed speech that requires speech-to-text translation from a database or may acquire a to-be-processed speech input by a user through the translation software installed on the electronic device. The manner of acquiring the to-be-processed speech is not limited in this embodiment.

The end-to-end speech translation model may be a pretrained multilayer neural network. The end-to-end speech translation model may include an encoder and a decoder. According to actual needs, the encoder and the decoder may be various different network structures. As an example, one recurrent neural network (RNN) may be used as the encoder, and another RNN may be used as the decoder. The encoder and the decoder may also be other forms of network structures, such as convolutional neural networks (CNN). The encoder may perform feature extraction on the input content to obtain an eigenvector. That is, the electronic device inputs the to-be-processed speech into the end-to-end speech translation model and extracts the semantic feature of the to-be-processed speech through the encoder of the end-to-end speech translation model. The semantic feature contains all information of the to-be-processed speech and serves as a high-dimensional intermediate representation of the to-be-processed speech.

In an embodiment, before the to-be-processed speech is input into the end-to-end speech translation model, the electronic device may perform processing such as spectrogram processing, log-Mel filter bank processing, and discrete cosine transform on the to-be-processed speech. Thus, Mel-frequency cepstral coefficients are extracted to obtain audio features. The obtained low-dimensional audio features are used as input of the end-to-end speech translation model. The low-dimensional audio features are encoded by the encoder of the end-to-end speech translation model to obtain the semantic feature of the to-be-processed speech.

In S102, the source language text corresponding to the semantic feature is decoded from the semantic feature by the decoder of the end-to-end speech translation model.

The encoder of the end-to-end speech translation model described above performs feature extraction on the input content to obtain an eigenvector. The encoder decodes the eigenvector according to context information to obtain a corresponding output text. To improve the decoding performance of the decoder of the end-to-end speech translation model, a continuous decoding mechanism is introduced in this embodiment of the present application. That is, in the decoding process, the decoder first predicts a relatively simple source language text and then predicts a relatively difficult target language text. In this manner, after obtaining the semantic feature of the to-be-processed speech, the electronic device inputs the semantic feature into the decoder of the end-to-end speech translation model. The decoder decodes the semantic feature to obtain the source language text corresponding to the semantic feature.

Figure 2:
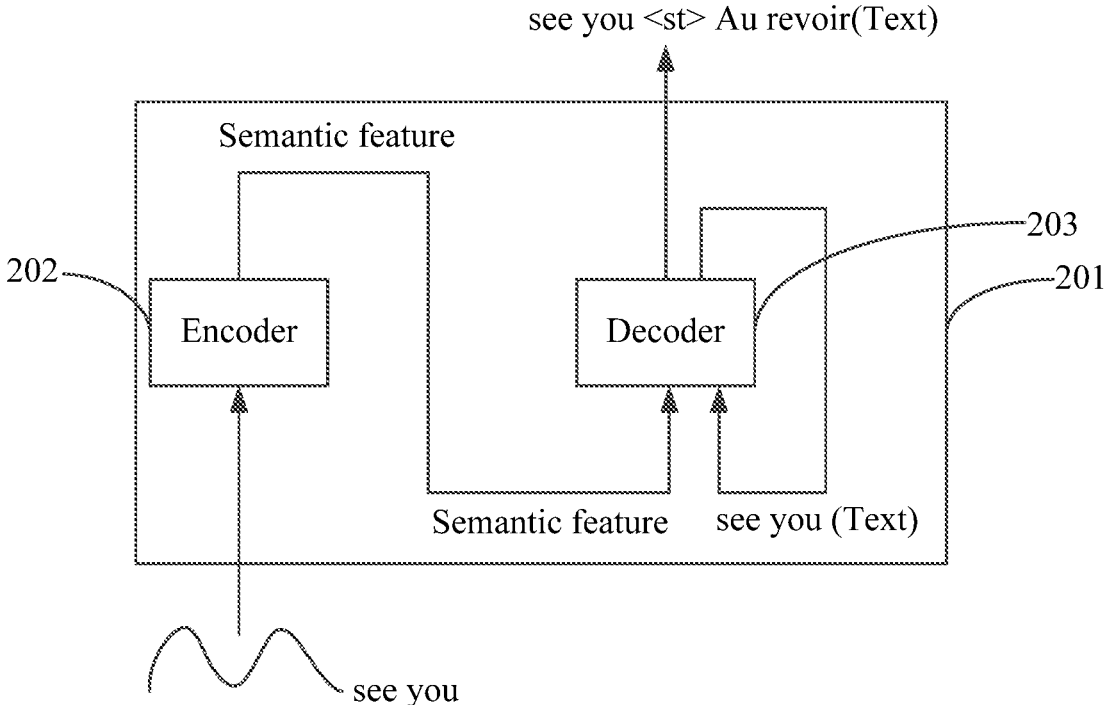
FIG. 2 is a schematic diagram of a principle of a speech translation process according to an embodiment of the present application.

Referring to FIG. 2, assuming that the source language of the to-be-processed speech is English and the target language of the translated text is French, if the to-be-processed speech is "see you", the electronic device inputs the to-be-processed speech into an end-to-end speech translation model 201. The semantic feature of the to-be-processed speech is extracted through an encoder 202 of the end-to-end speech translation model 201. The obtained semantic feature is input into a decoder 203 of the end-to-end speech translation model 201. The source language text "see you" corresponding to the semantic feature is decoded from the semantic feature by the decoder 203.

In S103, the semantic feature is decoded by the decoder of the end-to-end speech translation model according to the source language text to obtain a text sequence corresponding to the semantic feature.

After decoding the source language text corresponding to the semantic feature, the decoder of the end-to-end speech translation model continues to perform secondary decoding on the semantic feature. In the process of secondary decoding, since the source language text is known, the electronic device may use the source language text as a reference for subsequent decoding and continue decoding the semantic feature of the to-be-processed speech according to the source language text, thereby obtaining the text sequence corresponding to the to-be-processed speech. The text sequence includes the source language text and a target language text corresponding to the source language text. The source language text is connected to the target language text by a task identifier. Compared with the decoder decoding multiple tasks at the same time, the continuous decoding mechanism introduced in this embodiment of the present application relieves the decoding pressure of the decoder. Moreover, when predicting the text sequence corresponding to the to-be-processed speech, since the source language text corresponding to the to-be-processed speech is known, the accuracy of decoding can be improved by continuing decoding the semantic feature of the to-be-processed speech in combination with the known source language text.

With continued reference to FIG. 2, the electronic device uses the source language text "see you" decoded by the decoder 203 as a reference for decoding the semantic feature. The secondary decoding is performed on the semantic feature by the decoder 203 in combination with the source language text "see you". Thus, a text sequence "see you <st> Au revoir" corresponding to the to-be-processed speech is decoded.

In S104, the text sequence is split to obtain a target language text corresponding to the to-be-processed speech.

Since the source language text is connected to the target language text corresponding to the source language text by the task identifier, the electronic device may split the text sequence output from the decoder according to the task identifier, thereby obtaining the target language text corresponding to the to-be-processed speech.

With continued reference to FIG. 2, assuming that the connection identifier between the source language text and the target language text is "<st>", the electronic device may split the text sequence "see you <st> Au revoir" output from the decoder 203 based on the connection identifier. Thus, the to-be-processed speech "see you" is translated into the target language text "Au revoir".

According to the speech translation method provided in this embodiment of the present application, the electronic device extracts the semantic feature of the to-be-processed speech through the encoder of the end-to-end speech translation model. The source language text corresponding to the semantic feature is decoded from the semantic feature by the decoder of the end-to-end speech translation model. The semantic feature is decoded by the decoder of the end-to-end speech translation model according to the source language text to obtain the text sequence corresponding to the semantic feature. The text sequence is split to obtain the target language text corresponding to the to-be-processed speech. When decoding the semantic feature of the to-be-processed speech, the decoder of the end-to-end speech translation model may first decode the source language text from the semantic feature and continue decoding the semantic feature based on the known source language text. That is, through the continuous decoding mechanism, the relatively simple source language text is predicted first and then the relatively difficult target language text is predicted, thereby relieving the decoding pressure of the decoder. Moreover, when predicting the target language text, the source language text corresponding to the target language text is known, thereby improving the decoding performance of the decoder and the prediction performance of the end-to-end speech translation model.

In practical applications, the length of the audio features of the to-be-processed speech is much longer than the length of the source language text corresponding to the to-be-processed speech. This is not conducive to the extraction of the semantic feature of the to-be-processed speech by the encoder of the end-to-end speech translation model. Therefore, the extraction of the semantic feature of the to-be-processed speech may be performed with reference to the process described in the following embodiments. On the basis of the preceding embodiments, in an embodiment, the encoder may include a first encoder and a second encoder. As shown in FIG. 3, the preceding step S101 may include the following steps.

In S301, an acoustic feature of the to-be-processed speech is extracted through the first encoder.

The encoder of the end-to-end speech translation model described above performs feature extraction on the input content to obtain an eigenvector. The decoder decodes the eigenvector according to context information to obtain a corresponding output text. To improve the decoding performance of the decoder of the end-to-end speech translation model, a continuous decoding mechanism is introduced in this embodiment of the present application. That is, in the decoding process, the decoder first predicts a relatively simple source language text and then predicts a relatively difficult target language text. In this manner, after obtaining the semantic feature of the to-be-processed speech, the electronic device inputs the semantic feature into the decoder of the end-to-end speech translation model. The decoder decodes the semantic feature to obtain the source language text corresponding to the semantic feature.

The electronic device inputs the to-be-processed speech into the first encoder. The to-be-processed speech is acoustically encoded through the multihead self-attention module of the first encoder to extract high-dimensional acoustic feature representation of the to-be-processed speech. In an embodiment, before inputting the to-be-processed speech into the first encoder, the electronic device may further perform processing such as downsampling and linear layer processing on the audio features of the to-be-processed speech. The downsampling refers to dimensionality reduction of the input audio features in the time domain. To simplify the end-to-end speech translation model, a manual downsampling manner may be used for the downsampling, that is, the manner of collecting one frame for every three audio frames. Other downsampling manners may be used, which is not limited to this embodiment. The linear layer may map the frequency-domain feature dimension of the downsampled audio to a hidden layer dimension of the network.

In S302, a blank frame and a duplicate frame in the acoustic feature are detected, and the blank frame is eliminated and the duplicate frame is combined to obtain a contracted acoustic feature.

The blank frame and duplicate frame may exist in the acoustic feature of the to-be-processed speech extracted by the first encoder. The blank frame may be understood as an audio frame without content information. The duplicate frame may be understood as an audio frame with repeated content information. To avoid semantic interference caused by the blank frame and the duplicate frame, an acoustic unit contraction layer may be added between the first encoder and the second encoder. The blank frame and the duplicate frame in the acoustic feature are detected by the acoustic unit contraction layer. The detected blank frame is eliminated from the acoustic feature, and the duplicate frame is combined to obtain the contracted acoustic feature. After eliminating the blank frame and combining the duplicate frame in the acoustic feature of the to-be-processed speech, the length of the obtained contracted acoustic feature is greatly shortened compared with the length of the acoustic feature before the processing, thereby facilitating the subsequent extraction of the high-level semantic feature by the second encoder.

As an embodiment, the electronic device may detect the blank frame and the duplicate frame in the acoustic feature based on a spike characteristic of a probability distribution of a connectionist temporal classification loss function.

The connectionist temporal classification (CTC) loss function introduces a blank (this blank frame has no prediction value). Each predicted classification corresponds to one spike in the entire segment of speech, the other positions that are not spike are considered as blanks. For a segment of speech, the CTC finally outputs a spike sequence, regardless of how long each phoneme lasts. Therefore, for the to-be-processed speech, the electronic device may detect the blank frame and the duplicate frame in the acoustic feature of the to-be-processed speech based on the spike characteristic of the probability distribution of the CTC.

In S303, the semantic feature in the contracted acoustic feature is extracted through the second encoder.

After contracting the acoustic feature of the to-be-processed speech, the electronic device inputs the contracted acoustic feature into the second encoder. The high-level semantic feature in the contracted acoustic feature is extracted through the second encoder. The second encoder may include a multilayer self-attention module. The high-level semantic feature in the contracted acoustic feature is extracted by stacked multilayer self-attention modules.

In this embodiment, during the process of extracting the semantic feature of the to-be-processed speech through the encoder of the end-to-end speech translation model, the electronic device may perform contraction processing on the acoustic feature of the to-be-processed speech extracted by the first encoder, that is, eliminating the blank frame in the acoustic feature and combining the duplicate frame in the acoustic feature. In this manner, interference of the blank frame and the duplicate frame is reduced, and it is conducive to extracting the high-level semantic feature by the second encoder. Thus, the encoding performance of the encoder is improved, further improving the prediction performance of the entire end-to-end speech translation model.

In practical applications, due to the lack of training data of the end-to-end speech translation model, the training of an end-to-end speech translation model is very time consuming and labor intensive. Therefore, in an embodiment, a training process of the end-to-end speech translation model is further provided. In the training process, machine translation data with abundant data sources may be fully utilized, thereby improving the decoding performance of the decoder. On the basis of the preceding embodiments, in an embodiment, as shown in FIG. 4, the training process of the end-to-end speech translation model may include the following steps.

In S401, the decoder of the end-to-end speech translation model is pre-trained according to a text translation sample to obtain an initial decoder.

Speech recognition parallel data may improve the prediction performance of the end-to-end speech translation model. However, due to the lack of speech recognition parallel data, the training of the end-to-end speech translation model is very time consuming and labor intensive, and the prediction performance still does not meet the desired requirements. There are a large number of samples of machine translation parallel data, and how to use the machine translation parallel data with a large number of samples to train the end-to-end speech translation model is worth considering.

In this embodiment of the present application, the decoder of the end-to-end speech translation model introduces the continuous decoding mechanism, that is, the decoder first decodes the source language sample in the semantic feature and then decodes the text sequence corresponding to the semantic feature based on the source language sample. Therefore, under the continuous decoding structure of the decoder, the machine translation data can be fully utilized. Thus, the electronic device may pre-train the decoder of the end-to-end speech translation model based on the machine translation data (that is, text translation samples).

In an embodiment, the text translation sample may include a source language sample text and a target language sample text corresponding to the source language sample text. The decoder of the end-to-end speech translation model is pre-trained through a large number of source language sample texts and target language sample texts corresponding to the source language sample texts so that the decoder converges better. Therefore, in an embodiment, the process in which the electronic device pre-trains the decoder of the end-to-end speech translation model according to the text translation samples to obtain the initial decoder may include the following steps.

In S4011, the source language sample text and the target language sample text are spliced to obtain a spliced sample sequence.

To facilitate distinguishing between the source language sample text and the target language sample text corresponding to the source language sample text, the electronic device may splice the source language sample text and the target language sample text through a preset task identifier, thereby obtaining the spliced sample sequence.

In S4012, the source language sample text and an all-zero vector are used as input of the decoder of the end-to-end speech translation model, while the spliced sample sequence is used as desired output, and the decoder is pre-trained based on a masked cross-entropy loss function to obtain the initial decoder.

The masked cross-entropy loss function is used for masking a prediction loss of a source language prediction text corresponding to the all-zero vector. Different from the training of end-to-end speech translation model, there is no corresponding audio feature as input in the pre-training stage. To be consistent with subsequent fine-tuning of the parameters of the decoder of the end-to-end speech translation model, an all-zero vector may be used as the output of the encoder of the end-to-end speech translation model. That is, the all-zero vector is input into the decoder as the semantic feature of the to-be-processed speech. Meanwhile, in order to let the decoder focus only on prediction of a target language prediction sample on the premise that the source language sample text is known, the masked cross-entropy loss function may be used as the target function of the decoder to mask the prediction loss of the source language prediction text corresponding to the all-zero vector.

In this manner, the electronic device may input the source language sample text and the all-zero vector into the decoder of the end-to-end speech translation model. The prediction sample sequence corresponding to the all-zero vector is predicted according to the source language sample text, and the loss value between the prediction sample sequence and the spliced sample sequence is calculated based on the masked cross-entropy loss function. Parameters of the decoder are adjusted based on the loss value until the convergence condition of the masked cross-entropy loss function is reached, thereby obtaining the initial decoder.

In S402, the decoder of the end-to-end speech translation model is initialized based on the initial decoder.

After obtaining the initial decoder, the electronic device may initialize the parameters of the decoder of the end-to-end speech translation model based on the values of the parameters of the initial decoder. That is, the initial values of the parameters of the decoder of the end-to-end speech translation model are set to the values of corresponding parameters of the initial decoder. Through this pre-training manner, it is possible to avoid a long and slow learning stage at the early stage of the model training, thereby greatly reducing the training time of the model. Meanwhile, a large amount of tedious hyperparameter optimization can be avoided.

In S403, the initialized end-to-end speech translation model is trained.

The electronic device uses the joint optimization method to train the initialized end-to-end speech translation model as a whole. Since the end-to-end speech translation model includes an encoder and a decoder and the encoder includes a first encoder and a second encoder, the loss value of the loss function of the end-to-end speech translation model is a weighted sum of the first loss value corresponding to the first encoder, the second loss value corresponding to the second encoder, and the third loss value corresponding to the decoder. The parameters of the end-to-end speech translation model are adjusted based on the weighted sum of the first loss value, the second loss value, and the third loss value until the convergence condition of the loss function is reached, thereby obtaining the end-to-end speech translation model.

In an embodiment, during the process of training the end-to-end speech translation model, the training process of the first encoder may be as follows: using a sample speech in a training sample set of the end-to-end speech translation model as input of the first encoder, using a sample phoneme sequence corresponding to the sample speech as desired output, and training the first encoder based on the connectionist temporal classification loss function.

The training sample set of the end-to-end speech translation model includes multiple training samples. Each training sample includes a sample speech, a sample phoneme sequence corresponding to the sample speech, and a sample text sequence corresponding to the sample speech. The electronic device may input the sample speech in the training sample into the first encoder to obtain the actual output of the first encoder, that is, an actual phoneme sequence.

The electronic device may use the sample phoneme sequence corresponding to the sample speech in the training sample as the desired output of the first encoder. The difference value between the actual output of the first encoder and the desired output of the first encoder is calculated based on the CTC loss function and serves as the first loss value of the end-to-end speech translation model. The parameters of the first encoder are adjusted in combination with the weighted sum of the first loss value, the preceding second loss value and the preceding third loss value, thereby implementing the training of the first encoder. In the training process of the first encoder, the CTC loss function is introduced as an auxiliary supervisory signal for training, and the output of the softmax layer of the first decoder is supervised through the CTC loss function. Meanwhile, the phoneme sequence is used as the optimization target of the CTC loss function. The phoneme sequence is used because modeling units of a phoneme are few, and the phoneme is selected according to the pronouncing dictionary and is closer to the pronunciation information of a speech. Thus, the mapping relationship from the speech to the phoneme is more easily learned by the model, more acoustic information in the sample speech is retained, and the encoding performance of the encoder is improved.

In this embodiment, the electronic device may pre-train the decoder of the end-to-end speech translation model based on the continuous decoding mechanism of the decoder. The decoder of the end-to-end speech translation model is initialized based on the obtained initial decoder after pre-training. The initialized end-to-end speech translation model is trained. With this training manner, the machine translation parallel data with a large number of samples can be fully utilized, thereby improving the decoding performance of the decoder and the prediction performance of the end-to-end speech translation model. Meanwhile, the long and slow learning stage at the early stage of the model training is also avoided, thereby greatly reducing the training time of the model and improving the training efficiency of the end-to-end speech translation model.

Figures 5, 6:
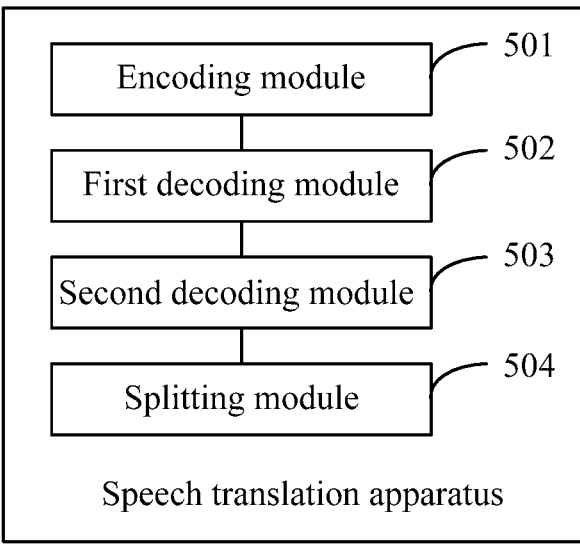
FIG. 5 is a diagram illustrating the structure of a speech translation apparatus according to an embodiment of the present application.
FIG. 6 is a diagram illustrating the structure of an electronic device according to an embodiment of the present application.

FIG. 5 is a diagram illustrating the structure of a speech translation apparatus according to an embodiment of the present application. As shown in FIG. 5, the apparatus may include an encoding module 501, a first decoding module 502, a second decoding module 503, and a splitting module 504.

The encoding module 501 is configured to extract, through an encoder of an end-to-end speech translation model, a semantic feature of a to-be-processed speech.

The first decoding module 502 is configured to decode, through a decoder of the end-to-end speech translation model, a source language text corresponding to the semantic feature from the semantic feature.

The second decoding module 503 is configured to decode, through the decoder of the end-to-end speech translation model, the semantic feature according to the source language text to obtain a text sequence corresponding to the semantic feature. The text sequence includes the source language text and a target language text corresponding to the source language text.

The splitting module 504 is configured to split the text sequence to obtain the target language text corresponding to the to-be-processed speech.

According to the speech translation apparatus provided in this embodiment of the present application, the electronic device extracts the semantic feature of the to-be-processed speech through the encoder of the end-to-end speech translation model. The source language text corresponding to the semantic feature is decoded from the semantic feature by the decoder of the end-to-end speech translation model. The semantic feature is decoded by the decoder of the end-to-end speech translation model according to the source language text to obtain the text sequence corresponding to the semantic feature. The text sequence is split to obtain the target language text corresponding to the to-be-processed speech. When decoding the semantic feature of the to-be-processed speech, the decoder of the end-to-end speech translation model may first decode the source language text from the semantic feature and continue to decode the semantic feature based on the known source language text. That is, through the continuous decoding mechanism, the relatively simple source language text is predicted first and then the relatively difficult target language text is predicted, thereby relieving the decoding pressure of the decoder. Moreover, when predicting the target language text, the source language text corresponding to the target language text is known, thereby the decoding performance of the decoder and the prediction performance of the end-to-end speech translation model are improved.

On the basis of the preceding embodiments, in an embodiment, the encoder may include a first encoder and a second encoder. The encoding module 501 may include a first encoding unit, an acoustic contraction unit, and a second encoding unit.

The first encoding unit is configured to extract the acoustic feature of the to-be-processed speech through the first encoder.

The acoustic contraction unit is configured to detect a blank frame and a duplicate frame in the acoustic feature, and then eliminate the blank frame and combine the duplicate frame to obtain a contracted acoustic feature.

The second encoding unit is configured to extract the semantic feature in the contracted acoustic feature through the second encoder.

On the basis of the preceding embodiments, in an embodiment, the apparatus may also include a pre-training module, an initialization module, and an end-to-end training module.

The pre-training module is configured to pre-train the decoder of the end-to-end speech translation model according to a text translation sample to obtain an initial decoder.

The initialization module is configured to initialize the decoder of the end-to-end speech translation model based on the initial decoder.

The end-to-end training module is configured to train the initialized end-to-end speech translation model.

In an embodiment, the text translation sample may include a source language sample text and a target language sample text corresponding to the source language sample text.

On the basis of the preceding embodiments, in an embodiment, the pre-training module is configured to splice the source language sample text and the target language sample text to obtain a spliced sample sequence; use the source language sample text and an all-zero vector as input of the decoder of the end-to-end speech translation model and use the spliced sample sequence as desired output, and pre-train the decoder based on a masked cross-entropy loss function to obtain an initial decoder. The masked cross-entropy loss function is configured to mask the prediction loss of the source language prediction text corresponding to the all-zero vector.

On the basis of the preceding embodiments, in an embodiment, the training process of the first encoder includes using a sample speech in a training sample set of the end-to-end speech translation model as input of the first encoder, using a sample phoneme sequence corresponding to the sample speech as desired output; and training the first encoder based on a connectionist temporal classification loss function.

On the basis of the preceding embodiments, in an embodiment, the acoustic contraction unit is configured to detect a blank frame and a duplicate frame in the acoustic feature based on a spike characteristic of a probability distribution of a connectionist temporal classification loss function.

Referring to FIG. 6, FIG. 6 shows a structure diagram of an electronic device 600 suitable for implementing this embodiment of the present disclosure. The electronic device in this embodiment of the present disclosure may include, but is not limited to, a mobile phone, a laptop, a digital broadcast receiver, a personal digital assistant (PDA), a portable Android device (PAD), a personal multimedia player (PMP), a vehicle-mounted terminal (for example, a vehicle-mounted navigation terminal) and other mobile terminals, and a digital television (TV), a desktop computer and other stationary terminals. The electronic device shown in FIG. 6 is merely an example and is not intended to limit the function and usage scope of the embodiments of the present disclosure.

As shown in FIG. 6, the electronic device 600 may include a processing apparatus 601 (such as a central processing unit or a graphics processor). The processing apparatus 601 may perform various appropriate actions and processing according to a program stored in a read-only memory (ROM) 602 or a program loaded into a random access memory (RAM) 603 from a storage apparatus 608. Various programs and data required for the operation of the electronic device 600 are also stored in the RAM 603. The processing apparatus 601, the ROM 602, and the RAM 603 are connected to each other through a bus 604. An input/output (I/O) interface 605 is also connected to the bus 604.

Generally, the following apparatus may be connected to the I/O interface 605: a touch screen, a touch pad, a keyboard, a mouse, a camera, a microphone, an accelerometer, a gyroscope, and other input apparatuses 606; a liquid crystal display (LCD), a speaker, a vibrator, and other output apparatuses 607; a magnetic tape, a hard disk, and other storage apparatuses 608; and a communication apparatus 609. The communication apparatus 609 may allow the electronic device 600 to perform wireless or wired communication with other devices to exchange data. FIG. 6 shows the electronic device 600 having various apparatuses, but it is not necessary to implement or be equipped with all the shown apparatuses. More or fewer apparatuses may be implemented instead.

According to the embodiments of the present disclosure, the process described above with reference to the flowchart may be implemented as a computer software program. For example, the embodiments of the present disclosure include a computer program product. The computer program product includes a computer program carried in a non-transitory computer-readable medium. The computer program contains program codes for executing the method shown in the flowchart. In such an embodiment, the computer program may be downloaded from a network and installed through the communication apparatus 609, or may be installed from the storage apparatus 608, or may be installed from the ROM 602. When the computer program is executed by the processing apparatus 601, the preceding functions limited in the method of the embodiments of the present disclosure are executed.

The preceding computer-readable medium in the present disclosure may be a computer-readable signal medium, a computer-readable storage medium, or any combination thereof. The computer-readable storage medium, for example, may be, but is not limited to, an electronic, magnetic, optical, electromagnetic, infrared, or semiconductor system, apparatus, device, or any combination thereof. The computer-readable storage medium may include, but is not limited to, an electrical connection having one or more wires, a portable computer magnetic disk, a hard disk, a RAM, a ROM, an erasable programmable read-only memory (EPROM), a flash memory, an optical fiber, a portable compact disc read-only memory (CD-ROM), an optical storage device, a magnetic storage device, or any suitable combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, and is not limited to, an electromagnetic signal, an optical signal, or any suitable combination thereof. The computer-readable signal medium may also be any computer-readable medium other than the computer-readable storage medium. The computer-readable signal medium may send, propagate, or transmit a program used by or in conjunction with an instruction execution system, apparatus, or device. The program codes contained in the computer-readable medium may be transmitted in any suitable medium, including, but not limited to, a wire, an optical cable, a radio frequency (RF), or any suitable combination thereof.

In some embodiments, clients and servers may communicate using any currently known or future developed network protocol, such as the hypertext transfer protocol (HTTP), and may be interconnected with any form or medium of digital data communication (for example, a communication network). Examples of the communication network include a local area network (LAN), a wide area network (WAN), an internet (for example, the Internet), a peer-to-peer network (for example, an Ad-Hoc network), and any network currently known or to be developed in the future.

The computer-readable medium may be contained in the electronic device or may exist alone without being assembled into the electronic device.

The computer-readable medium carries one or more programs. When the one or more programs are executed by the electronic device, the electronic device extracts the semantic feature of the to-be-processed speech through the encoder of the end-to-end speech translation model; decodes, through the decoder of the end-to-end speech translation model, a source language text corresponding to the semantic feature from the semantic feature; decodes, through the decoder of the end-to-end speech translation model, the semantic feature according to the source language text to obtain a text sequence corresponding to the semantic feature, where the text sequence includes the source language text and a target language text corresponding to the source language text; and splits the text sequence to obtain a target language text corresponding to the to-be-processed speech.

Computer program codes for executing the operations in the present disclosure may be written in one or more programming languages or combination thereof. The preceding one or more programming languages include, but are not limited to, object-oriented programming languages such as Java, Smalltalk, and C++, as well as conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case involving the remote computer, the remote computer may be connected to the user computer through any type of network including a LAN or a WAN, or may be connected to an external computer (for example, via the Internet through an Internet service provider).

The flowcharts and block diagrams in the drawings show the possible architecture, function, and operation of the system, method, and computer program product according to various embodiments of the present disclosure. In this regard, each block in the flowcharts or block diagrams may represent a module, a program segment, or part of codes that contains one or more executable instructions for implementing specified logical functions. In some alternative implementations, the functions marked in the blocks may occur in an order different from that marked in the drawings. For example, two successive blocks may, in fact, be executed substantially in parallel or in a reverse order, which depends on the functions involved. Each block in the block diagrams and/or flowcharts and a combination of blocks in the block diagrams and/or flowcharts may be implemented by a specific-purpose hardware-based system which executes specified functions or operations or a combination of specific-purpose hardware and computer instructions.

The units involved in the embodiments of the present disclosure may be implemented by software or hardware. The names of the units do not constitute a limitation on the units in a certain circumstance.

The functions described above herein may be executed, at least partially, by one or more hardware logic components. For example, without limitations, exemplary types of hardware logic components that may be used include a field programmable gate array (FPGA), an application-specific integrated circuit (ASIC), an application specific standard product (ASSP), a system on a chip (SoC), and a complex programmable logic device (CPLD).

In the context of the present disclosure, the machine-readable medium may be a tangible medium that may contain or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, device, or any suitable combination thereof. The machine-readable storage medium includes an electrical connection based on one or more wires, a portable computer disk, a hard disk, a RAM, a ROM, an EPROM, a flash memory, an optical fiber, a portable CD-ROM, an optical storage device, a magnetic storage device, or any suitable combination thereof.

The speech translation apparatus, the device, and the storage medium according to the preceding embodiments can execute the speech translation method according to any embodiment of the present disclosure and have function modules and beneficial effects corresponding to this method. For technical details not described in detail in the preceding embodiments, reference may be made to the speech translation method provided in any embodiment of the present application.

According to one or more embodiments of the present disclosure, a speech translation method is provided. The method includes the followings: extracting, through an encoder of an end-to-end speech translation model, the semantic feature of a to-be-processed speech; decoding, through a decoder of the end-to-end speech translation model, the source language text corresponding to the semantic feature from the semantic feature; decoding, through the decoder of the end-to-end speech translation model, the semantic feature according to the source language text to obtain a text sequence corresponding to the semantic feature, where the text sequence includes the source language text and a target language text corresponding to the source language text; and splitting the text sequence to obtain a target language text corresponding to the to-be-processed speech.

In an embodiment, the encoder includes a first encoder and a second encoder. According to one or more embodiments of the present disclosure, the preceding speech translation method is provided. The method also includes extracting the acoustic feature of the to-be-processed speech through the first encoder; detecting blank frames and duplicate frames in the acoustic feature, eliminating the blank frame and combining the duplicate frame to obtain a contracted acoustic feature; and extracting the semantic feature in the contracted acoustic feature through the second encoder.

According to one or more embodiments of the present disclosure, the preceding speech translation method is provided. The method also includes pre-training the decoder of the end-to-end speech translation model according to a text translation sample to obtain an initial decoder; initializing the decoder of the end-to-end speech translation model based on the initial decoder; and training the initialized end-to-end speech translation model.

In an embodiment, the text translation sample includes a source language sample text and a target language sample text corresponding to the source language sample text.

According to one or more embodiments of the present disclosure, the preceding speech translation method is provided. The method also includes splicing the source language sample text and the target language sample text to obtain a spliced sample sequence; using the source language sample text and an all-zero vector as input of the decoder of the end-to-end speech translation model; using the spliced sample sequence as desired output; and pre-training the decoder based on a masked cross-entropy loss function to obtain an initial decoder. The masked cross-entropy loss function is configured to mask the prediction loss of the source language prediction text corresponding to the all-zero vector.

According to one or more embodiments of the present disclosure, the preceding speech translation method is provided. The method also includes using a sample speech in a training sample set of the end-to-end speech translation model as input of the first encoder; using a sample phoneme sequence corresponding to the sample speech as desired output; and training the first encoder based on a connectionist temporal classification loss function.

According to one or more embodiments of the present disclosure, the preceding speech translation method is provided. The method also includes detecting a blank frame and a duplicate frame in the acoustic feature based on a spike characteristic of a probability distribution of a connectionist temporal classification loss function.

In addition, although the operations are depicted in a particular order, this should not be construed as requiring that such operations should be performed in the particular order shown or in sequential order. In certain circumstances, multitasking and parallel processing may be advantageous. Similarly, although implementation details are contained in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually or in any suitable sub-combination.

What is claimed is:

1. A speech translation method, comprising:

extracting, through an encoder of an end-to-end speech translation model, a semantic feature of a to-be-processed speech;

decoding, through a decoder of the end-to-end speech translation model, a source language text corresponding to the semantic feature from the semantic feature;

decoding, through the decoder of the end-to-end speech translation model, the semantic feature according to the source language text to obtain a text sequence corresponding to the semantic feature, wherein the text sequence comprises the source language text and a target language text corresponding to the source language text; and splitting the text sequence to obtain the target language text corresponding to the to-be-processed speech, wherein a training process of the end-to-end speech translation model comprises:

pre-training, according to a text translation sample, the decoder of the end-to-end speech translation model to obtain an initial decoder; and initializing the decoder of the end-to-end speech translation model based on the initial decoder; and training the initialized end-to-end speech translation model, wherein the text translation sample comprises a source language sample text and a target language sample text corresponding to the source language sample text, and wherein pre-training, according to the text translation sample, the decoder of the end-to-end speech translation model to obtain the initial decoder comprises:

splicing the source language sample text and the target language sample text to obtain a spliced sample sequence; and pre-training, based on a masked cross-entropy loss function, the decoder by using the source language sample text and an all-zero vector as input of the decoder of the end-to-end speech translation model and the spliced sample sequence as desired output to obtain the initial decoder, wherein the masked cross-entropy loss function is configured to mask a prediction loss of a source language prediction text corresponding to the all-zero vector.

2. The method according to claim 1, wherein the encoder comprises a first encoder and a second encoder, and extracting, through the encoder of the end-to-end speech translation model, the semantic feature of the to-be-processed speech comprises:

extracting, through the first encoder, an acoustic feature of the to-be-processed speech;

detecting a blank frame and a duplicate frame in the acoustic feature, eliminating the blank frame and combining the duplicate frame to obtain a contracted acoustic feature; and extracting, through the second encoder, the semantic feature in the contracted acoustic feature.

3. The method according to claim 2, wherein detecting the blank frame and the duplicate frame in the acoustic feature comprises:

detecting, based on a spike characteristic of a probability distribution of a connectionist temporal classification loss function, the blank frame and the duplicate frame in the acoustic feature.

4. An electronic device, comprising a processor and a memory storing computer programs, wherein the computer programs, when executed by the processor, implement the following:

extracting, through an encoder of an end-to-end speech translation model, a semantic feature of a to-be-processed speech;

decoding, through a decoder of the end-to-end speech translation model, a source language text corresponding to the semantic feature from the semantic feature;

decoding, through the decoder of the end-to-end speech translation model, the semantic feature according to the source language text to obtain a text sequence corresponding to the semantic feature, wherein the text sequence comprises the source language text and a target language text corresponding to the source language text; and splitting the text sequence to obtain the target language text corresponding to the to-be-processed speech, wherein a training process of the end-to-end speech translation model comprises:

pre-training, according to a text translation sample, the decoder of the end-to-end speech translation model to obtain an initial decoder; and initializing the decoder of the end-to-end speech translation model based on the initial decoder; and training the initialized end-to-end speech translation model, wherein the text translation sample comprises a source language sample text and a target language sample text corresponding to the source language sample text, and wherein pre-training, according to the text translation sample, the decoder of the end-to-end speech translation model to obtain the initial decoder comprises:

splicing the source language sample text and the target language sample text to obtain a spliced sample sequence; and pre-training, based on a masked cross-entropy loss function, the decoder by using the source language sample text and an all-zero vector as input of the decoder of the end-to-end speech translation model and the spliced sample sequence as desired output to obtain the initial decoder, wherein the masked cross-entropy loss function is configured to mask a prediction loss of a source language prediction text corresponding to the all-zero vector.

5. A non-transitory computer-readable storage medium storing computer programs, wherein the computer programs, when executed by a processor, implement the following:

extracting, through an encoder of an end-to-end speech translation model, a semantic feature of a to-be-processed speech;

decoding, through a decoder of the end-to-end speech translation model, a source language text corresponding to the semantic feature from the semantic feature;

decoding, through the decoder of the end-to-end speech translation model, the semantic feature according to the source language text to obtain a text sequence corresponding to the semantic feature, wherein the text sequence comprises the source language text and a target language text corresponding to the source language text; and splitting the text sequence to obtain the target language text corresponding to the to-be-processed speech, wherein a training process of the end-to-end speech translation model comprises:

pre-training, according to a text translation sample, the decoder of the end-to-end speech translation model to obtain an initial decoder; and initializing the decoder of the end-to-end speech translation model based on the initial decoder; and training the initialized end-to-end speech translation model, wherein the text translation sample comprises a source language sample text and a target language sample text corresponding to the source language sample text, and wherein pre-training, according to the text translation sample, the decoder of the end-to-end speech translation model to obtain the initial decoder comprises:

splicing the source language sample text and the target language sample text to obtain a spliced sample sequence; and pre-training, based on a masked cross-entropy loss function, the decoder by using the source language sample text and an all-zero vector as input of the decoder of the end-to-end speech translation model and the spliced sample sequence as desired output to obtain the initial decoder, wherein the masked cross-entropy loss function is configured to mask a prediction loss of a source language prediction text corresponding to the all-zero vector.

6. The method according to claim 2, wherein a training process of the first encoder comprises:

training, based on a connectionist temporal classification loss function, the first encoder by using a sample speech in a training sample set of the end-to-end speech translation model as input of the first encoder and a sample phoneme sequence corresponding to the sample speech as desired output.

7. The electronic device according to claim 4, wherein the encoder comprises a first encoder and a second encoder, and the computer programs implement extracting, through the encoder of the end-to-end speech translation model, the semantic feature of the to-be-processed speech by:

extracting, through the first encoder, an acoustic feature of the to-be-processed speech;

detecting a blank frame and a duplicate frame in the acoustic feature, eliminating the blank frame and combining the duplicate frame to obtain a contracted acoustic feature; and extracting, through the second encoder, the semantic feature in the contracted acoustic feature.

8. The electronic device according to claim 7, wherein the computer programs implement detecting the blank frame and the duplicate frame in the acoustic feature by:

detecting, based on a spike characteristic of a probability distribution of a connectionist temporal classification loss function, the blank frame and the duplicate frame in the acoustic feature.

9. The storage medium according to claim 5, wherein the encoder comprises a first encoder and a second encoder, and the computer programs implement extracting, through the encoder of the end-to-end speech translation model, the semantic feature of the to-be-processed speech by:

extracting, through the first encoder, an acoustic feature of the to-be-processed speech;

detecting a blank frame and a duplicate frame in the acoustic feature, eliminating the blank frame and combining the duplicate frame to obtain a contracted acoustic feature; and extracting, through the second encoder, the semantic feature in the contracted acoustic feature.

10. The electronic device according to claim 4, wherein a training process of the first encoder comprises:

training, based on a connectionist temporal classification loss function, the first encoder by using a sample speech in a training sample set of the end-to-end speech translation model as input of the first encoder and a sample phoneme sequence corresponding to the sample speech as desired output.

11. The storage medium according to claim 9, wherein detecting the blank frame and the duplicate frame in the acoustic feature comprises:

detecting, based on a spike characteristic of a probability distribution of a connectionist temporal classification loss function, the blank frame and the duplicate frame in the acoustic feature.

12. The storage medium according to claim 5, wherein a training process of the first encoder comprises:

training, based on a connectionist temporal classification loss function, the first encoder by using a sample speech in a training sample set of the end-to-end speech translation model as input of the first encoder and a sample phoneme sequence corresponding to the sample speech as desired output.

* * * * *